US010990524B2

(12) United States Patent
Huang et al.

(10) Patent No.: US 10,990,524 B2
(45) Date of Patent: Apr. 27, 2021

(54) MEMORY WITH PROCESSING IN MEMORY ARCHITECTURE AND OPERATING METHOD THEREOF

(71) Applicant: Powerchip Semiconductor Manufacturing Corporation, Hsinchu (TW)

(72) Inventors: Frank Chong-Jen Huang, Taipei (TW); Yung-Nien Koh, Taipei (TW)

(73) Assignee: Powerchip Semiconductor Manufacturing Corporation, Hsinchu (TW)

(*) Notice: Subject to any disclaimer, the term of this patent is extended or adjusted under 35 U.S.C. 154(b) by 1 day.

(21) Appl. No.: 16/563,956

(22) Filed: Sep. 9, 2019

(65) Prior Publication Data

US 2020/0117597 A1   Apr. 16, 2020

Related U.S. Application Data

(60) Provisional application No. 62/744,140, filed on Oct. 11, 2018, provisional application No. 62/785,234, filed on Dec. 27, 2018.

(30) Foreign Application Priority Data

Jun. 6, 2019 (TW) ................................ 108119618

(51) Int. Cl.
*G06F 12/06* (2006.01)
*G06F 13/16* (2006.01)
*G06N 3/04* (2006.01)

(52) U.S. Cl.
CPC ...... *G06F 12/0646* (2013.01); *G06F 13/1668* (2013.01); *G06N 3/04* (2013.01); *G06F 2212/1016* (2013.01)

(58) Field of Classification Search
CPC ............. G06F 12/0646; G06F 13/1668; G06F 3/0656; G06F 9/5061

(Continued)

(56) References Cited

U.S. PATENT DOCUMENTS

| 5,953,738 A | 9/1999 | Rao |
| 6,026,475 A | 2/2000 | Woodman |

(Continued)

FOREIGN PATENT DOCUMENTS

TW            I427480         2/2014

OTHER PUBLICATIONS

"Office Action of Taiwan Counterpart Application", dated Jul. 2, 2020, p. 1-p. 10.

*Primary Examiner* — Than Nguyen
(74) *Attorney, Agent, or Firm* — JCIPRNET (57) ABSTRACT

A memory with a processing in memory architecture and an operating method thereof are provided. The memory includes a memory array, a mode register, an artificial intelligence core, and a memory interface. The memory array includes a plurality of memory regions. The mode register stores a plurality of memory mode settings. The memory interface is coupled to the memory array and the mode register, and is externally coupled to a special function processing core. The artificial intelligence core is coupled to the memory array and the mode register. The plurality of memory regions are respectively selectively assigned to the special function processing core or the artificial intelligence core according to the plurality of memory mode settings of the mode register, so that the special function processing core and the artificial intelligence core respectively access different memory regions in the memory array according to the plurality of memory mode settings.

14 Claims, 5 Drawing Sheets

(58) Field of Classification Search
USPC .......................................................... 711/173
See application file for complete search history.

(56) References Cited

U.S. PATENT DOCUMENTS

| | | | |
|---|---|---|---|
| 2001/0052061 A1* | 12/2001 | Fradette | H04L 69/08 |
| | | | 711/202 |
| 2003/0204783 A1 | 10/2003 | Kuroda | |
| 2007/0074430 A1* | 4/2007 | Coomer | A61F 5/0104 |
| | | | 36/145 |
| 2008/0046665 A1* | 2/2008 | Kim | G11C 7/1075 |
| | | | 711/149 |
| 2011/0261640 A1* | 10/2011 | Matsui | G11C 7/1075 |
| | | | 365/230.05 |
| 2011/0264845 A1* | 10/2011 | Choi | G11C 16/0483 |
| | | | 711/103 |
| 2014/0157065 A1 | 6/2014 | Ong | |
| 2017/0277659 A1 | 9/2017 | Akerib et al. | |
| 2018/0033479 A1 | 2/2018 | Lea et al. | |
| 2019/0333570 A1* | 10/2019 | Kim | G11C 11/40618 |
| 2019/0337966 A1* | 11/2019 | Le | C07D 513/04 |

\* cited by examiner

MEMORY WITH PROCESSING IN MEMORY ARCHITECTURE AND OPERATING METHOD THEREOF

CROSS-REFERENCE TO RELATED APPLICATION

This application claims the priority benefits of U.S. provisional application Ser. No. 62/744,140, filed on Oct. 11, 2018, U.S. provisional application Ser. No. 62/785,234, filed on Dec. 27, 2018 and Taiwan application serial no. 108119618, filed on Jun. 6, 2019. The entirety of each of the above-mentioned patent applications is hereby incorporated by reference herein and made a part of this specification.

BACKGROUND

Technical Field

The disclosure relates to a circuit architecture, particularly to a memory with a processing in memory (PIM) architecture and an operating method thereof.

Related Art

With the evolution of artificial intelligence (AI) operations, the artificial intelligence operations have been more and more widely applied. For example, a neural network operation such as image data analysis, voice data analysis and natural language processing is performed through a neural network model. Moreover, with the increasing complexity of neural network operations, current computer apparatuses for performing the artificial intelligence operations have become unable to meet current neural network operation requirements and provide fast and effective operating performance.

Therefore, a dedicated processing core has currently been designed so that a neural network operation can be performed using the dedicated processing core. However, although the operating capability of the dedicated processing core can be fully utilized by having the dedicated processing core independently perform the neural network operation, the processing speed of the dedicated processing core is still limited by the data access speed. Since the dedicated processing core and other special function processing cores read memory data via the same shared bus, in the event that the shared bus is occupied by the other special function processing cores, the dedicated processing core cannot acquire in real time the data required to perform an artificial intelligence operation. In view of this, solutions of several embodiments will be proposed below to the issue of how to design a processing architecture capable of promptly performing an artificial intelligence operation.

SUMMARY

The disclosure provides a memory with a processing in memory architecture and an operating method thereof, in which data required to perform a neural network operation, which is stored in a memory chip, can be directly read by an artificial intelligence (AI) core integrated into the memory, thereby promptly performing the neural network operation.

The memory with the processing in memory architecture of the disclosure includes a memory array, a mode register, a memory interface and an artificial intelligence core. The memory array includes a plurality of memory regions. The mode register is configured to store a plurality of memory mode settings. The memory interface is coupled to the memory array and the mode register, and is externally coupled to a special function processing core. The artificial intelligence core is coupled to the memory array and the mode register. The plurality of memory regions are respectively selectively assigned to the special function processing core or the artificial intelligence core according to the plurality of memory mode settings of the mode register, so that the special function processing core and the artificial intelligence core respectively access different memory regions in the memory array according to the plurality of memory mode settings.

In an embodiment of the disclosure, the special function processing core and the artificial intelligence core simultaneously access the different memory regions in the memory array respectively via their respective dedicated memory buses.

In an embodiment of the disclosure, the plurality of memory regions include a first memory region and a second memory region. The first memory region is configured for exclusive access by the artificial intelligence core. The second memory region is configured for exclusive access by the special function processing core.

In an embodiment of the disclosure, the plurality of memory regions further include a plurality of data buffer regions. The artificial intelligence core and the memory interface alternately access different data in the plurality of data buffer regions.

In an embodiment of the disclosure, when the artificial intelligence core performs a neural network operation, the artificial intelligence core reads input data of one of the plurality of data buffer regions as an input parameter, and reads weight data of the first memory region. The artificial intelligence core outputs feature map data to the first memory region.

In an embodiment of the disclosure, when the artificial intelligence core performs the neural network operation, the artificial intelligence core reads the feature map data of the first memory region as a next input parameter, and reads another weight data of the first memory region. The artificial intelligence core outputs next feature map data to one of the plurality of data buffer regions to overwrite the one of the plurality of data buffer regions.

In an embodiment of the disclosure, the plurality of data buffer regions are respectively and alternately assigned to the special function processing core or the artificial intelligence core, so that a first memory space corresponding to the artificial intelligence core includes the first memory region and one of the plurality of data buffer regions, and a second memory space corresponding to the special function processing core includes the second memory region and another one of the plurality of data buffer regions.

In an embodiment of the disclosure, the width of a bus dedicated between the artificial intelligence core and the plurality of memory regions is greater than the width of an external bus between the special function processing core and the memory interface.

In an embodiment of the disclosure, the plurality of memory regions respectively correspond to a plurality of row buffer blocks, and the plurality of memory regions each include a plurality of memory banks. The width of a bus dedicated between the artificial intelligence core and the plurality of memory regions is greater than or equal to data amount of an entire row of the plurality of memory banks.

In an embodiment of the disclosure, the memory is a dynamic random access memory chip.

The operating method of a memory with a processing in memory architecture of the disclosure is suitable for a memory that includes a memory array, a mode register, a memory interface and an artificial intelligence core. The operating method includes following steps. A plurality of memory regions in the memory are respectively selectively assigned to a special function processing core or the artificial intelligence core according to a plurality of memory mode settings of the mode register; and different memory regions in the memory array are respectively accessed by the special function processing core or the artificial intelligence core according to the plurality of memory mode settings.

In an embodiment of the disclosure, the special function processing core and the artificial intelligence core simultaneously access the different memory regions in the memory array respectively via their respective dedicated memory buses.

In an embodiment of the disclosure, the plurality of memory regions include a first memory region and a second memory region, the first memory region is configured for exclusive access by the artificial intelligence core, and the second memory region is configured for exclusive access by the special function processing core.

In an embodiment of the disclosure, the plurality of memory regions further include a plurality of data buffer regions, and the artificial intelligence core and the memory interface alternately access different data in the plurality of data buffer regions.

In an embodiment of the disclosure, when the artificial intelligence core performs a neural network operation, the step in which the different memory regions in the memory array are respectively accessed by the special function processing core or the artificial intelligence core according to the plurality of memory mode settings of the mode register includes the following. Input data of one of the plurality of data buffer regions is read as an input parameter by the artificial intelligence core; weight data of the first memory region is read by the artificial intelligence core; and feature map data is outputted to the first memory region by the artificial intelligence core.

In an embodiment of the disclosure, when the artificial intelligence core performs the neural network operation, the step in which the different memory regions in the memory array are respectively accessed by the special function processing core or the artificial intelligence core according to the plurality of memory mode settings of the mode register further includes the following. The feature map data of the first memory region is read as a next input parameter by the artificial intelligence core; another weight data of the first memory region is read by the artificial intelligence core; and next feature map data is outputted to one of the plurality of data buffer regions by the artificial intelligence core to overwrite the one of the plurality of data buffer regions.

In an embodiment of the disclosure, the plurality of data buffer regions are respectively and alternately assigned to the special function processing core or the artificial intelligence core, so that a first memory space corresponding to the artificial intelligence core includes the first memory region and one of the plurality of data buffer regions, and a second memory space corresponding to the special function processing core includes the second memory region and another one of the plurality of data buffer regions.

In an embodiment of the disclosure, the width of a bus dedicated between the artificial intelligence core and the plurality of memory regions is greater than the width of an external bus between the special function processing core and the memory interface.

In an embodiment of the disclosure, the plurality of memory regions respectively correspond to a plurality of row buffer blocks, and the plurality of memory regions each include a plurality of memory banks. A width of a bus dedicated between the artificial intelligence core and the plurality of memory regions is greater than or equal to data amount of an entire row of the plurality of memory banks.

In an embodiment of the disclosure, the memory is a dynamic random access memory chip.

Based on the above, in the memory and the operating method thereof according to the disclosure, the external special function processing core and the artificial intelligence core disposed in the memory can simultaneously access different memory regions in the memory array. Therefore, the memory of the disclosure is capable of promptly performing a neural network operation.

To make the above features and advantages of the disclosure more comprehensible, examples accompanied with drawings are described in detail as follows.

DESCRIPTION OF THE EMBODIMENTS

In order to make the disclosure more comprehensible, exemplary embodiments are described below as the examples to demonstrate that the disclosure can actually be realized. Moreover, wherever appropriate in the drawings and embodiments, elements/components/steps with the same reference numbers represent the same or similar parts.

Figure 1:
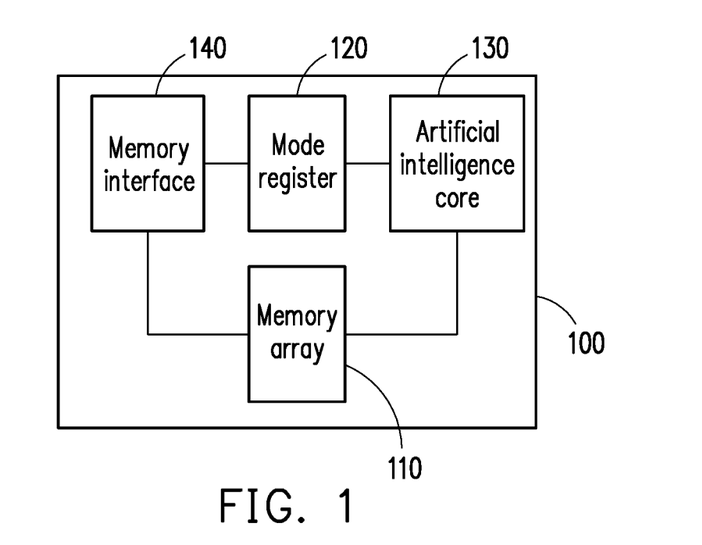
FIG. 1 illustrates a schematic block diagram of a memory according to an embodiment of the disclosure.

FIG. 1 illustrates a schematic block diagram of a memory according to an embodiment of the disclosure. Referring to FIG. 1, a memory 100 includes a memory array 110, a mode register 120, an artificial intelligence (AI) core 130, and a memory interface 140. The memory array 110 is coupled to the artificial intelligence core 130 and the memory interface 140. The mode register 120 is coupled to the memory array 110, the artificial intelligence core 130 and the memory interface 140. The memory array 110 includes a plurality of memory regions. The plurality of memory regions are each configured to store specific data (also called datasets). Moreover, in an embodiment, the memory 100 may further include a plurality of dedicated memory control units. The plurality of dedicated memory control units respectively perform data access operations corresponding to the plurality of memory regions in a one-to-one manner. In the present embodiment, the memory interface 140 may be externally coupled to a special function processing core. Moreover, the plurality of memory regions are respectively selectively assigned to the special function processing core or the artificial intelligence core 130 according to a plurality of memory mode settings stored in the mode register 120, so that the special function processing core and the artificial intelligence core 130 respectively access different memory regions in the memory array 110 according to the plurality of memory mode settings. Moreover, the memory 100 of the present embodiment is capable of performing an artificial intelligence operation.

In the present embodiment, the memory 100 may be a dynamic random access memory (DRAM) chip, and may be, for example, a processing in memory (PIM) architecture constructed by circuit elements such as a control logic, an arithmetic logic, a cache unit and so on. The artificial intelligence core 130 may be integrated into a peripheral circuit region of the memory 100 to directly access a plurality of memory banks of the memory array 110 through a dedicated memory controller and a dedicated bus. Moreover, the artificial intelligence core 130 may be pre-designed to have functions and characteristics for performing a specific neural network operation. In other words, the memory 100 of the present embodiment has a function of performing an artificial intelligence operation, and the artificial intelligence core 130 and the external special function processing core can simultaneously access the memory array 110, so as to provide highly efficient data access and operation effects.

In the present embodiment, the special function processing core may be, for example, a central processing unit (CPU) core, an image signal processor (ISP) core, a digital signal processor (DSP) core, a graphics processing unit (GPU) core or other similar special function processing core. In the present embodiment, the special function processing core is coupled to the memory interface 140 via a shared bus (or standard bus) to access the memory array 110 via the memory interface 140. In this regard, since the artificial intelligence core 130 accesses the memory array 110 via a dedicated bus inside the memory, it will not be limited by the width or speed of the memory interface 140. Moreover, the artificial intelligence core 130 can promptly access the memory array 110 according to a specific data access mode.

Figure 2:
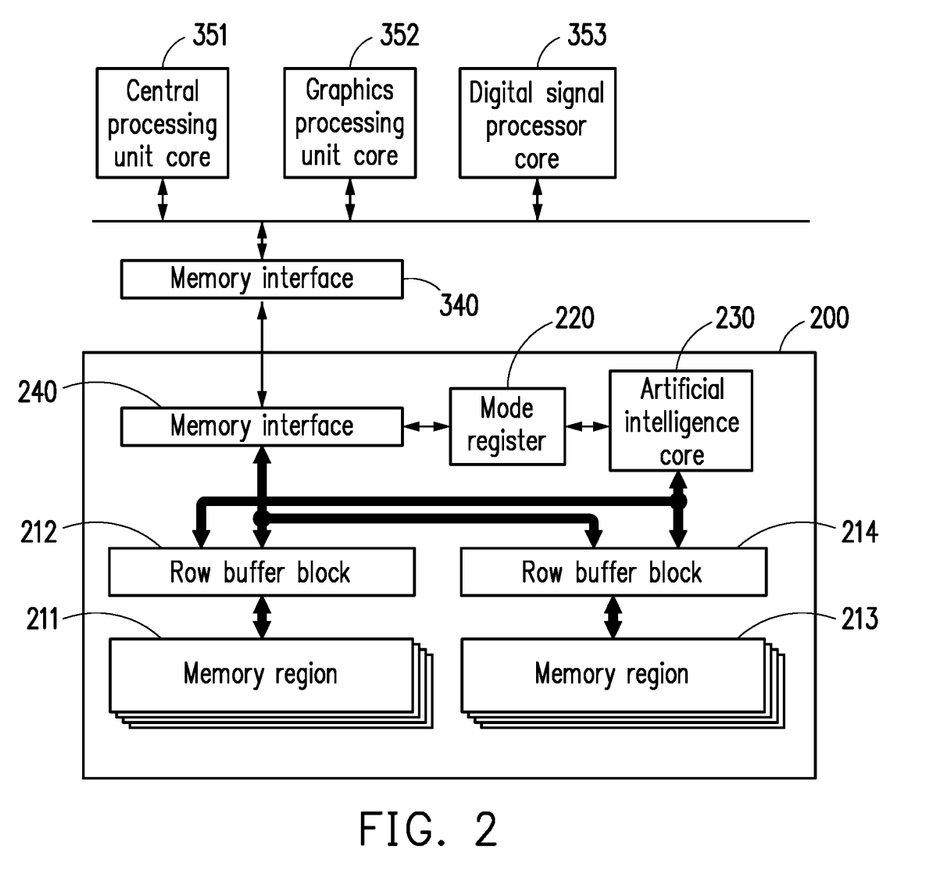
FIG. 2 illustrates a schematic diagram of an architecture of a memory and a plurality of special function processing cores according to an embodiment of the disclosure.

FIG. 2 illustrates a schematic diagram of an architecture of a memory and a plurality of special function processing cores according to an embodiment of the disclosure. Referring to FIG. 2, a memory 200 includes memory regions 211 and 213, row buffer blocks 212 and 214, a mode register 220, an artificial intelligence core 230 and a memory interface 240. In the present embodiment, the mode register 220 is coupled to the artificial intelligence core 230 and the memory interface 240 to provide a plurality of memory mode settings to the artificial intelligence core 230 and the memory interface 240, respectively. The artificial intelligence core 230 and the memory interface 240 each operate independently to access a memory array. The memory array includes the memory regions 211 and 213 as well as the row buffer blocks 212 and 214. The memory regions 211 and 213 each include a plurality of memory banks. The memory regions 211 and 213 may be data buffer regions. In the present embodiment, the memory interface 240 is externally coupled to another memory interface 340. The memory interface 340 is coupled to a central processing unit core 351, a graphics processing unit core 352 and a digital signal processor core 353 via, for example, a shared bus.

In the present embodiment, when the central processing unit core 351, the graphics processing unit core 352 and the digital signal processor core 353 need to simultaneously access the row buffer block 212 or the row buffer block 214, the central processing unit core 351, the graphics processing unit core 352 and the digital signal processor core 353 have to access the row buffer block 212 or the row buffer block 214 via the memory interfaces 240 and 340, in sequence or according to a queue. However, regardless of how the above-mentioned various special function processing cores are currently accessing the memory array, the artificial intelligence core 230 can access other memory regions in the memory array at the same time. In an embodiment, the memory region 211 or the memory region 213 may be, for example, suitable for accessing digitized input data, weight data, or feature map data required to perform a neural network operation or other machine learning operations.

It is worth noting that the above-mentioned various special function processing cores and the artificial intelligence core 230 simultaneously access different memory regions in the memory array respectively via their respective dedicated memory buses. That is, when the above-mentioned various special function processing cores access data in the memory region 211 via the row buffer block 212, the artificial intelligence core 230 may access data in the memory region 213 via the row buffer block 214. When the above-mentioned various special function processing cores access the data in the memory region 213 via the row buffer block 214, the artificial intelligence core 230 may access the data in the memory region 211 via the row buffer block 212. In other words, the above-mentioned various special function processing cores and the artificial intelligence core 230 may respectively and alternately access different data in the memory regions 211 and 213 serving as the data buffer regions. In addition, in an embodiment, the artificial intelligence core 230 may further include a plurality of caches or queues, and the artificial intelligence core 230 may promptly access the data in the memory region 211 or the memory region 213 through the plurality of caches or the plurality of queues in a pipeline manner.

Figure 3:
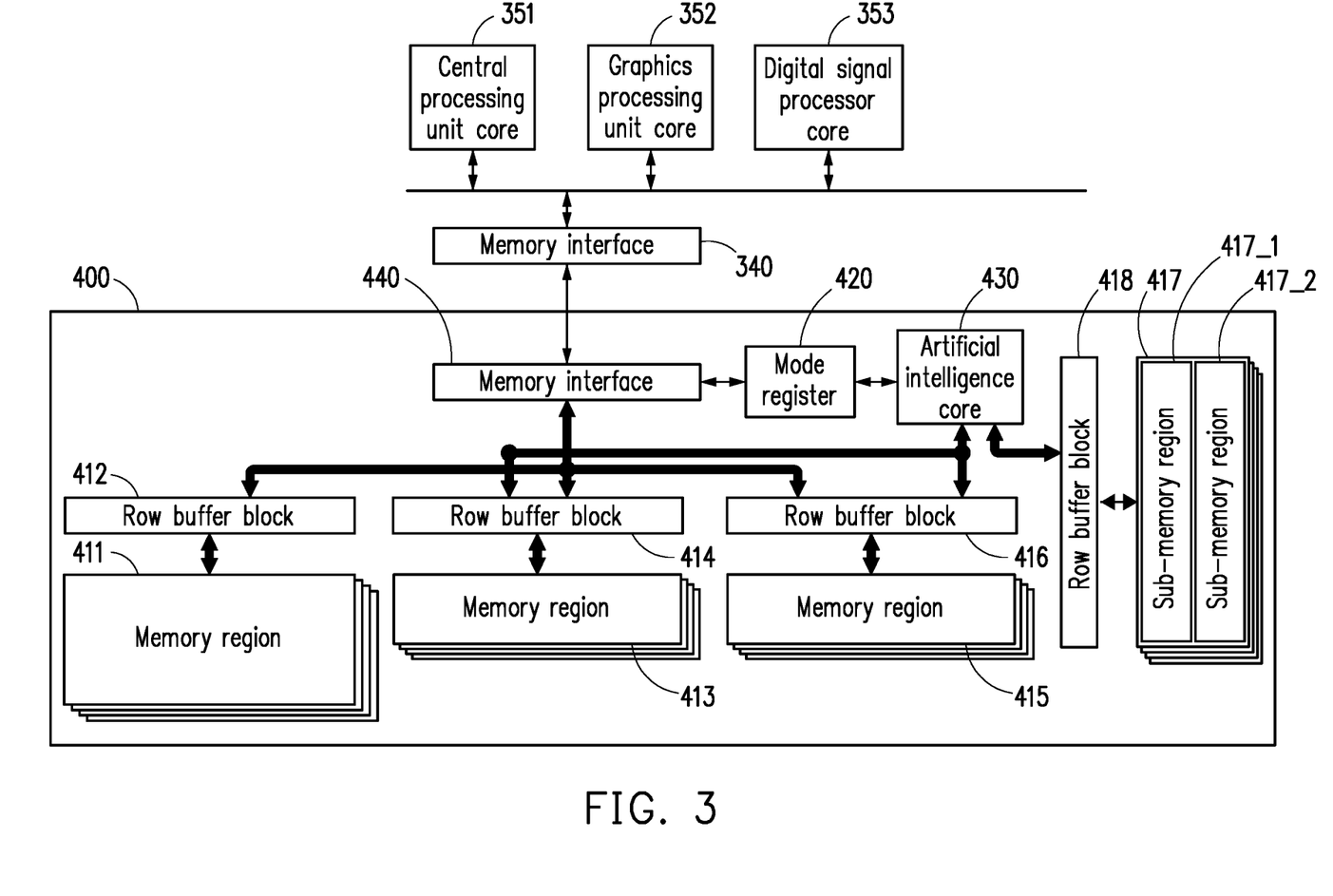
FIG. 3 illustrates a schematic diagram of an architecture of a memory and a plurality of special function processing cores according to another embodiment of the disclosure.

FIG. 3 illustrates a schematic diagram of an architecture of a memory and a plurality of special function processing cores according to another embodiment of the disclosure. Referring to FIG. 3, a memory 400 of the present embodiment includes memory region 411, 413, 415 and 417, row buffer blocks 412, 414, 416 and 418, a mode register 420, an artificial intelligence core 430 and a memory interface 440. In the present embodiment, the mode register 420 is coupled to the artificial intelligence core 430 and the memory interface 440 to provide a plurality of memory mode settings to the artificial intelligence core 430 and the memory interface 440, respectively. The memory interface 440 is coupled to the central processing unit core 351, the graphics processing unit core 352 and the digital signal processor core 353 via, for example, a shared bus. In the present embodiment, the artificial intelligence core 430 and the memory interface 440 each operate independently to access a memory array. The memory array includes the memory regions 411, 413, 415 and 417 as well as the row buffer blocks 412, 414, 416 and 418, and the memory regions 411, 413, 415 and 417 each include a plurality of memory banks.

In the present embodiment, the memory regions 413 and 415 may be data buffer regions. The memory region 411 is for exclusive access by the above-mentioned various special function processing cores, wherein the various special function processing cores may be, for example, the central processing unit core 351, the graphics processing unit core 352 and the digital signal processor core 353. The memory region 417 is for exclusive access by the artificial intelligence core 430. That is, when the above-mentioned various special function processing cores and the artificial intelligence core 430 respectively exclusively access the memory region 411 and the memory region 417, the access operations of the various special function processing cores and the artificial intelligence core 430 will not affect each other. For example, in the case of performing a neural network operation, an entire row of a plurality of memory banks of the memory region 417 may, for example, store a plurality of weight values of the weight data. The artificial intelligence core 430 may sequentially and alternately read each row of the plurality of memory banks of the memory region 417 dedicated to the artificial intelligence core 430 through the row buffer block 418, to promptly acquire the data required to perform the neural network operation.

Figure 4A:
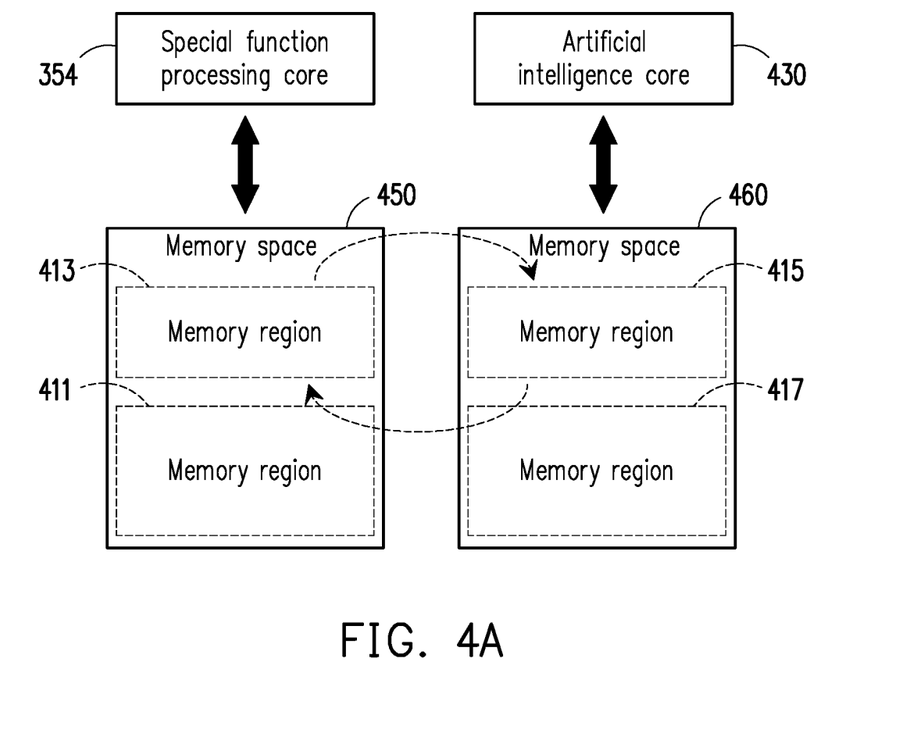
FIG. 4A and FIG. 4B illustrate schematic diagrams of exchanging addressing between different memory blocks in different memory spaces according to an embodiment of the disclosure.
Figure 4B:
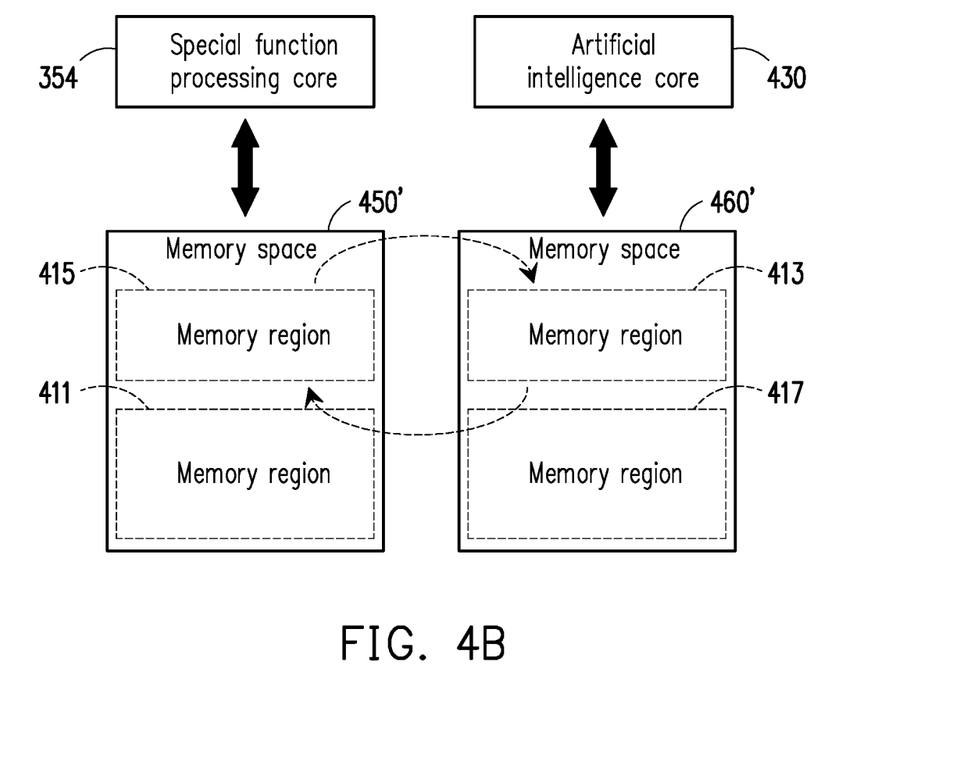

FIG. 4A and FIG. 4B illustrate schematic diagrams of exchanging addressing between different memory blocks in different memory spaces according to an embodiment of the disclosure. Referring to FIG. 3, FIG. 4A and FIG. 4B, a case where a neural network operation is continuously performed on a plurality of pieces of image data will be described below as an example and an access method of the memory 400 will be described with reference to FIG. 4A and FIG. 4B. An artificial intelligence operation performed by the artificial intelligence core 430 may be, for example, a deep neural network (DNN) operation, a convolutional neural network (CNN) operation, or a recurrent neural network (RNN) operation or the like; the disclosure is not limited thereto. In an implementation scenario, the memory region 417 includes sub-memory regions 417_1 and 417_2. The sub-memory region 417_1 is used, for example, to store the weight data having a plurality of weight values, and the sub-memory region 417_2 is used, for example, to store the feature map data having a plurality of feature values. In this implementation scenario, the memory region 413 is, for example, assigned to a special function processing core 354, and the memory region 415 is, for example, assigned to the artificial intelligence core 430. The special function processing core 354 may be, for example, the central processing unit core 351, the graphics processing unit core 352, or the digital signal processor core 353 of FIG. 3. Therefore, as shown in FIG. 4A, a memory space 450 corresponding to the special function processing core 354 includes the memory regions 411 and 413, and a memory space 460 corresponding to the artificial intelligence core 430 includes the memory regions 415 and 417.

In this implementation scenario, assuming that the special function processing core 354 is the digital signal processor core 353 of FIG. 3, the memory region 415 may store digitized input data such as image data previously stored by the digital signal processor core 353. The artificial intelligence core 430 may, for example, perform a neural network operation to perform image recognition on current image data stored in the memory region 415. The artificial intelligence core 430 may read the weight data of the memory region 417 via a dedicated bus and read the image data of the memory region 415 as an input parameter required for the neural network operation, thereby performing the neural network operation. Meanwhile, the digital signal processor core 353 may store a next image data in the memory region 413 via the memory interfaces 340 and 440.

Next, after the recognition of the image data of the memory region 415 is completed by the artificial intelligence core 430, by setting the mode register 420, the assigned memory space of the memory regions 413 and 415 can be exchanged to exchange the memory spaces where the memory regions 413 and 415 were located. Thus, after the memory regions 413 and 415 are exchanged by reassigning into the other memory space, as shown in FIG. 4B, a memory space 450' corresponding to the digital signal processor core 353 includes the memory regions 411 and 415, and a memory space 460' corresponding to the artificial intelligence core 430 includes the memory regions 413 and 417. At this moment, the artificial intelligence core 430 may continue to perform the neural network operation to perform the image recognition on a new piece of image data stored in the memory region 413. The artificial intelligence core 430 may read the weight data of the memory region 417 via the dedicated bus and read the new image data of the memory region 413 as an input parameter required for the neural network operation, thereby performing the neural network operation. Meanwhile, the digital signal processor core 353 may overwrite the memory region 415 via the memory interfaces 340 and 440 to store the next image data in the memory region 415. Accordingly, the memory 400 of the present embodiment provides a highly efficient data access operation, and the memory 400 is capable of realizing a neural network operation with high-speed execution effects.

Figure 5A:
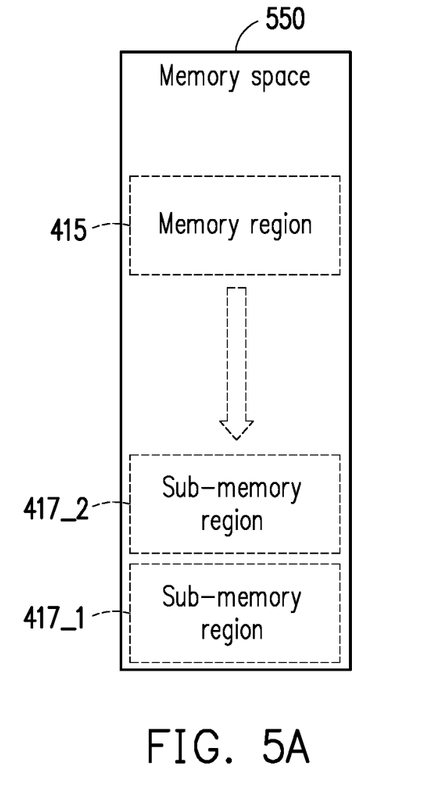
FIG. 5A and FIG. 5B illustrate schematic diagrams of exchanging access between different memory blocks in the same memory space according to an embodiment of the disclosure.
Figure 5B:
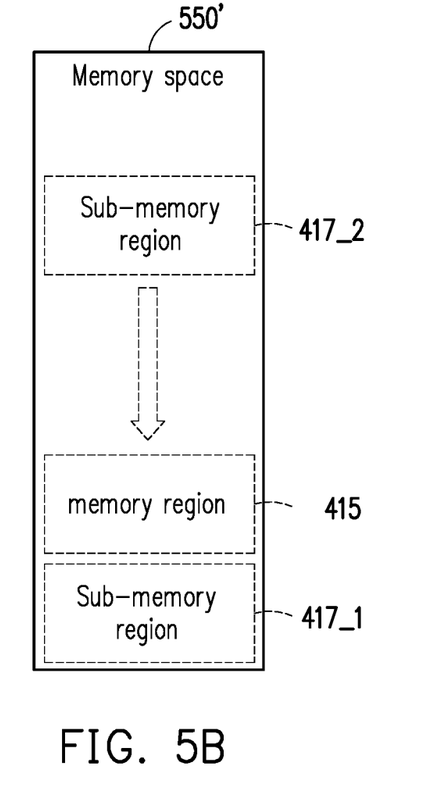

FIG. 5A and FIG. 5B illustrate schematic diagrams of exchanging access between different memory blocks in the same memory space according to an embodiment of the disclosure. Referring to FIG. 3, FIG. 5A and FIG. 5B, a case where a neural network operation is performed on image data will be described below as an example and another access method of the memory 400 will be described with reference to FIG. 5A and FIG. 5B. In the above-mentioned scenario, at the stage of the input layer of the neural network operation, a memory space 550 corresponding to the artificial intelligence core 430 may include, for example, the memory region 415 as well as the sub-memory regions 417_1 and 417_2. The artificial intelligence core 430 may read the memory region 415 to acquire input data and use it as an input parameter. The memory region 415 stores the image data previously stored by the digital signal processor core 353. Moreover, the artificial intelligence core 430 reads the weight data of the sub-memory region 417_1. Therefore, the artificial intelligence core 430 performs a neural network operation based on the input parameter and the weight data to generate feature map data, and the artificial intelligence core 430 stores the feature map data in the sub-memory region 417_2.

Next, at the next stage in the neural network operation, namely the stage of the hidden layer, a memory space 550' corresponding to the artificial intelligence core 430 includes the memory region 415 as well as the sub-memory regions 417_1 and 417_2. The artificial intelligence core 430 reads the feature map data previously stored in the sub-memory region 417_2 as an input parameter of the current hidden layer, and reads the weight data of the sub-memory region 417_1. Therefore, the artificial intelligence core 430 performs a neural network operation based on the input parameter and the weight data to generate new feature map data, and the artificial intelligence core 430 overwrites the sub-memory region 415 with the new feature map data. In other words, the memory space addressed by the artificial intelligence core 430 does not change, but the reading memory region and the writing memory region of the artificial intelligence core 430 are exchanged by setting the mode register 420. Based on this, the artificial intelligence core 430 of the present embodiment may use the memory region 415 and the sub-memory region 417_2 to alternately read the pre-generated feature map data and store current feature map data generated by the artificial intelligence core 430 during the course of the current neural network operation. Since each memory region has its own independent bus, the artificial intelligence core 430 of the present embodiment is capable of promptly acquiring input data and weight data, and of promptly performing the neural network operation and storing the data outputted.

Figure 6:
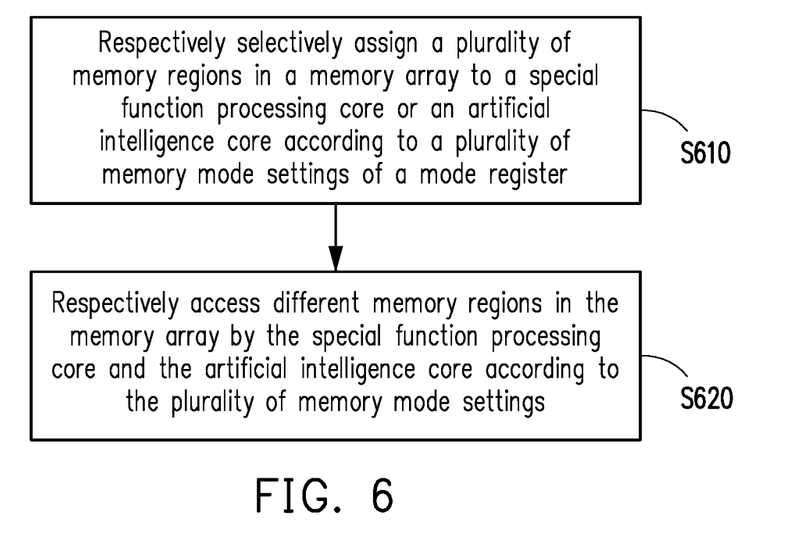
FIG. 6 illustrates a flowchart of an operating method of a memory according to an embodiment of the disclosure.

FIG. 6 illustrates a flowchart of an operating method of a memory according to an embodiment of the disclosure. Referring to FIG. 6, the operating method of a memory of the present embodiment is at least suitable for the memory 100 of FIG. 1 so that the memory 100 executes steps S610 and S620. The memory interface 140 of the memory 100 may be externally coupled to a special function processing core. In step S610, a plurality of memory regions of the memory array 110 are respectively selectively assigned to memory space of the special function processing core or the artificial intelligence core 130 according to a plurality of memory mode settings of the mode register 120. In step S620, the special function processing core and the artificial intelligence core 130 respectively access different memory regions in the memory array 110 according to the plurality of memory mode settings. Therefore, the operating method of a memory of the present embodiment enables the memory 100 to be accessed simultaneously by the special function processing core and the artificial intelligence core 130 so as to provide a highly efficient memory operation effect.

In addition, sufficient teaching, suggestions and descriptions for implementation regarding related internal elements, implementation manners and technical details of the memory 100 of the present embodiment may be obtained from the above descriptions of the embodiments of FIG. 1 to FIG. 5B, and thus, details thereof will not be repeated.

In summary, in the memory and the operating method thereof according to the disclosure, a plurality of specific memory mode settings may be designed by the mode register, so that a plurality of memory regions of the memory array can be respectively selectively assigned to the external special function processing core or the artificial intelligence core according to the plurality of specific memory mode settings. Accordingly, the external special function processing core and the artificial intelligence core can simultaneously access different memory regions in the memory array. Therefore, the artificial intelligence core disposed in the memory is capable of promptly performing a neural network operation.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A memory with a processing in memory architecture, comprising:
a memory array, comprising a plurality of memory regions;
a mode register, configured to store a plurality of memory mode settings;
a memory interface, coupled to the memory array and the mode register, and externally coupled to a special function processing core; and
an artificial intelligence core, coupled to the memory array and the mode register,
wherein the plurality of memory regions are respectively selectively assigned to the special function processing core or the artificial intelligence core according to the plurality of memory mode settings of the mode register, so that the special function processing core and the artificial intelligence core respectively access different memory regions in the memory array according to the plurality of memory mode settings,
wherein the plurality of memory regions comprise a first memory region and a second memory region, the first memory region is configured for exclusive access by the artificial intelligence core, and the second memory region is configured for exclusive access by the special function processing core,
wherein the plurality of memory regions further comprise a plurality of data buffer regions, and the artificial intelligence core and the memory interface alternately access different data in the plurality of data buffer regions,
wherein when the artificial intelligence core performs a neural network operation, the artificial intelligence core reads input data of one of the plurality of data buffer regions as an input parameter, and reads weight data of the first memory region, wherein the artificial intelligence core outputs feature map data to the first memory region.

2. The memory according to claim 1, wherein the special function processing core and the artificial intelligence core simultaneously access the different memory regions in the memory array respectively via their respective dedicated memory buses.

3. The memory according to claim 1, wherein when the artificial intelligence core performs the neural network operation, the artificial intelligence core reads the feature map data of the first memory region as a next input parameter, and reads another weight data of the first memory region, wherein the artificial intelligence core outputs next feature map data to one of the plurality of data buffer regions to overwrite the one of the plurality of data buffer regions.

4. The memory according to claim 1, wherein the plurality of data buffer regions are respectively and alternately assigned to the special function processing core or the artificial intelligence core, so that a first memory space corresponding to the artificial intelligence core comprises the first memory region and one of the plurality of data buffer regions, and a second memory space corresponding to the special function processing core comprises the second memory region and another one of the plurality of data buffer regions.

5. The memory according to claim 1, wherein a width of a bus dedicated between the artificial intelligence core and the plurality of memory regions is greater than a width of an external bus between the special function processing core and the memory interface.

6. The memory according to claim 1, wherein the plurality of memory regions respectively correspond to a plurality of row buffer blocks, and the plurality of memory regions each comprise a plurality of memory banks, wherein a width of a bus dedicated between the artificial intelligence core and the plurality of memory regions is greater than or equal to data amount of an entire row of the plurality of memory banks.

7. The memory according to claim 1, wherein the memory is a dynamic random access memory chip.

8. An operating method of a memory with a processing in memory architecture, the memory comprising a memory array, a mode register, a memory interface and an artificial intelligence core, wherein the operating method comprises:
respectively selectively assigning a plurality of memory regions in the memory to a special function processing core and the artificial intelligence core according to a plurality of memory mode settings of the mode register; and respectively accessing different memory regions in the memory array by the special function processing core and the artificial intelligence core according to the plurality of memory mode settings, wherein the plurality of memory regions comprise a first memory region and a second memory region, the first memory region is configured for exclusive access by the artificial intelligence core, and the second memory region is configured for exclusive access by the special function processing core, wherein the plurality of memory regions further comprise a plurality of data buffer regions, and the artificial intelligence core and the memory interface alternately access different data in the plurality of data buffer regions, wherein when the artificial intelligence core performs a neural network operation, the step of respectively accessing the different memory regions in the memory array by the special function processing core and the artificial intelligence core according to the plurality of memory mode settings of the mode register comprises:

reading input data of one of the plurality of data buffer regions as an input parameter by the artificial intelligence core;

reading weight data of the first memory region by the artificial intelligence core; and outputting feature map data to the first memory region by the artificial intelligence core.

9. The operating method of a memory according to claim 8, wherein the special function processing core and the artificial intelligence core simultaneously access the different memory regions in the memory array respectively via their respective dedicated memory buses.

10. The operating method of a memory according to claim 8, wherein when the artificial intelligence core performs the neural network operation, the step of respectively accessing the different memory regions in the memory array by the special function processing core and the artificial intelligence core according to the plurality of memory mode settings of the mode register further comprises:

reading the feature map data of the first memory region as a next input parameter by the artificial intelligence core;

reading another weight data of the first memory region by the artificial intelligence core; and outputting next feature map data to one of the plurality of data buffer regions by the artificial intelligence core to overwrite the one of the plurality of data buffer regions.

11. The operating method of a memory according to claim 8, wherein the plurality of data buffer regions are respectively and alternately assigned to the special function processing core or the artificial intelligence core, so that a first memory space corresponding to the artificial intelligence core comprises the first memory region and one of the plurality of data buffer regions, and a second memory space corresponding to the special function processing core comprises the second memory region and another one of the plurality of data buffer regions.

12. The operating method of a memory according to claim 8, wherein a width of a bus dedicated between the artificial intelligence core and the plurality of memory regions is greater than a width of an external bus between the special function processing core and the memory interface.

13. The operating method of a memory according to claim 8, wherein the plurality of memory regions respectively correspond to a plurality of row buffer blocks, and the plurality of memory regions each comprise a plurality of memory banks, wherein a width of a bus dedicated between the artificial intelligence core and the plurality of memory regions is greater than or equal to data amount of an entire row of the plurality of memory banks.

14. The operating method of a memory according to claim 8, wherein the memory is a dynamic random access memory chip.

\* \* \* \* \*